Aug. 4, 1959     W. B. FARRINGTON     2,897,717
ORIENTATION DEVICE FOR TRANSPARENT ELEMENT
Filed Nov. 9, 1955     2 Sheets-Sheet 1
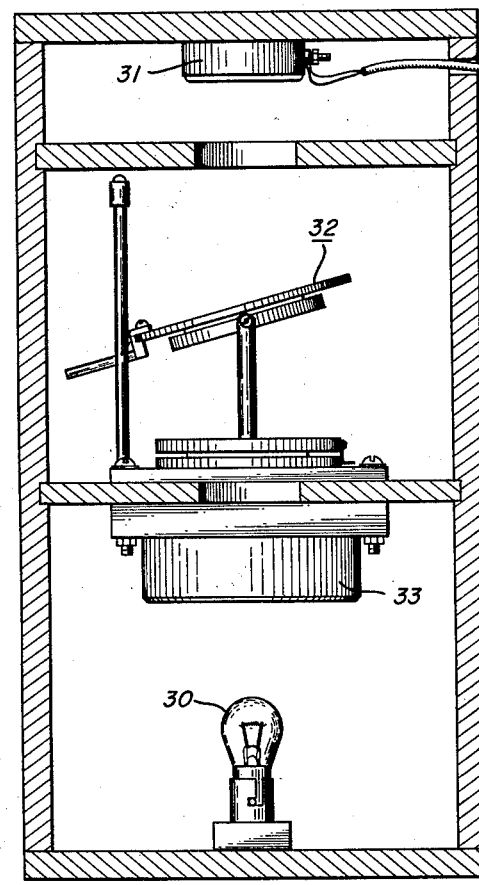
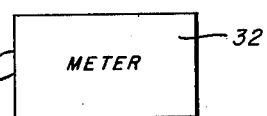
FIG. 3.
FIG. 1.
FIG. 2.
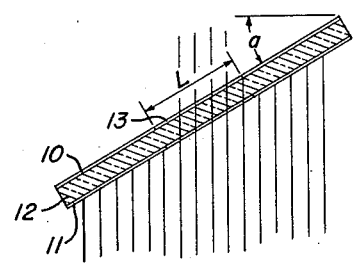
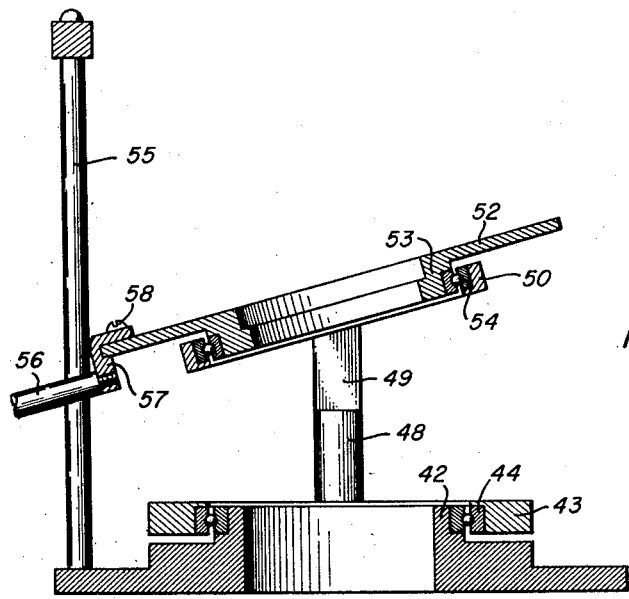
FIG. 6.
INVENTOR.
William B. Farrington,
BY Frank S. Triedl
ATTORNEY.

Aug. 4, 1959 W. B. FARRINGTON 2,897,717
ORIENTATION DEVICE FOR TRANSPARENT ELEMENT
Filed Nov. 9, 1955 2 Sheets-Sheet 2

INVENTOR.
William B. Farrington,
BY Frank S. Troidl
ATTORNEY.

United States Patent Office 2,897,717
Patented Aug. 4, 1959

2,897,717

ORIENTATION DEVICE FOR TRANSPARENT ELEMENT

William B. Farrington, Houston, Tex., assignor, by mesne assignments, to Jersey Production Research Company, Tulsa, Okla., a corporation of Delaware Application November 9, 1955, Serial No. 545,822

4 Claims. (Cl. 88—14)

This invention relates to a method and system for obtaining the directional trend of physical characteristics, contained within a sample, which have different light transmission or reflecting characteristics when compared to the other portions of the sample. More particularly, this invention relates to a method and system for obtaining the directional trend of pore spaces and sand grains contained within a sample.

In oil exploration and production the directional trend of certain physical characteristics, when known, may be helpful in discovering new oil deposits or in locating new oil wells. These physical characteristics include such things as the pore space and the orientation of grains of material. From the pore space contained within a sample, the porosity of the subsurface formation can be determined and from the directional trend of the long or elongate axis of the pore spaces, the direction of greatest permeability may be determined. From a determination of the directional trend of the long axis of quartz particles, evidence can be obtained on which to base deduction of former current directions of waves which deposited the sedimentary material being studied. This evidence is very useful in determining the direction of the trends of ancient buried sand bodies and in ascertaining the location of ancient shore lines in the subsurface. My new method is equally applicable to the determination of the orientation of isotropic characteristics such as the porosity as well as anisotropic characteristics. The only prerequisite to carrying out my new method is that the characteristic desired to be measured is capable of being photographed to show a contrast with its surrounding medium.

Briefly described my new method of determining the orientation of isotropic and anisotropic physical characteristics of a portion of a sample consists of first obtaining an orientated sample from the subsurface by means of a conventional well coring device or from an outcrop on the surface. The orientated sample is then photographed and at least two photographic transparencies are developed. The transparencies are spaced one from the other but in registered relationship to one another, and placed between a light source and a photocell. The "photograph sandwich" formed by the spaced photographic transparencies is tilted at an angle to the direction of the light source. The direction of the tilt or inclination is then rotated about a 360° angle while the angle of tilt or inclination is kept constant. The greatest amount of light will be indicated by the photocell when the directional trend of the long axis of the phsyical characteristic to be measured is facing in the same direction as the direction of inclination. From the orientation of the sample the orientation of the directional trend of the long axis of the physical characteristic measured can be determined.

An example of a system which may be utilized in carrying out my new method is described. This system consists broadly of a light source and a photocell between which is disposed an orientation device on which the photographic sandwich is mounted. The orientation device is designed to effect the continual change of the direction of inclination of the photographic sandwich while at the same time keeping the angle of inclination constant.

Other objects and a fuller understanding of the invention may be had by referring to the following description and claims, taken in conjunction with the accompanying drawings in which:

Figs. 1 and 2 are schematic diagrams designed to illustrate the reason why the maximum light intensity indicated by the new system indicates the directional trend of portions of a sample having different light transmission or reflection characteristics as compared to the remainder of the sample;

Fig. 3 shows a system which may be utilized in carrying out my new method;

Fig. 6 is a sectional elevational view of my new orientation device which may be utilized in carrying out my new method.

Figure 5:
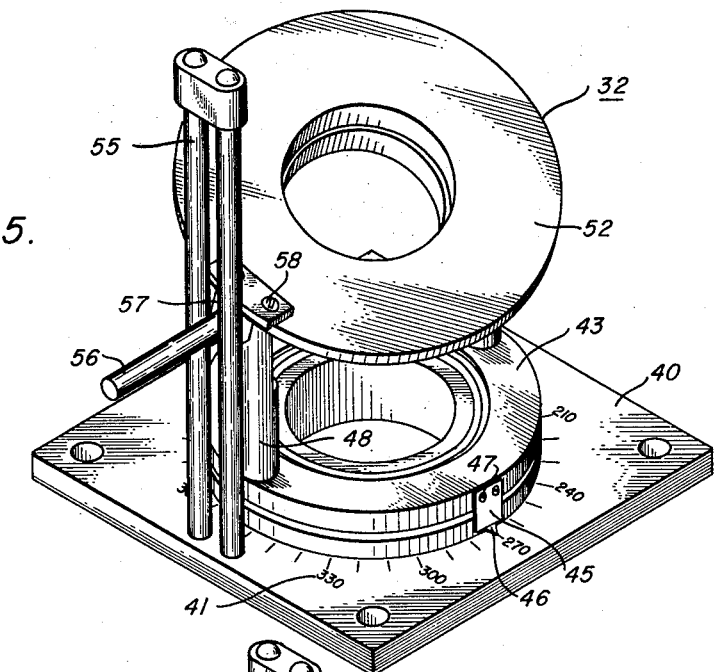
Fig. 5 is a second perspective view of the orientation device.

As previously stated, all that is necessary for carrying out my new method is that the physical characteristic, of which I desire to determine the directional trend, can be photographed to show a contrast with its surrounding medium. It is, therefore, necessary that the sample include elements, or if the pore space is being investigated, voids which transmit or reflect light to a greater or lesser degree than the background. If the elements of interest have a preferred direction of lengthwise orientation the direction can be obtained from the photographic sandwich. The reason why the direction of lengthwise orientation may be obtained is illustrated by Figs. 1 and 2. In Figs. 1 and 2 the photographic sandwich is shown consisting of photographic transparencies 10 and 11 separated by a glass plate 12. For purposes of illustration let us assume that it is desired to find the directional trend of the long axis of a transparent element 13 having a width W and a length L. If the photographic sandwich is tilted or inclined an angle "$a$" from the horizontal, it can be seen, from an examination of Figs. 1 and 2, that the maximum amount of light will be indicated by the photocell if the long axis L of the transparent section 13 is in the direction of the angle "$a$." A minimum amount of light will be transmitted when the short axis W of the element is in the direction of the angle $a$, since the upper portion of the upper photograph transparency and the lower portion of the lower transparency will tend to block most of the light rays that try to pass through the transparent element. This can be readily perceived upon a comparison of Figs. 1 and 2. (It should be noted that "photographic transparency" does not necessarily imply that the entire "transparency" will allow passage of light rays therethrough without substantial attenuation but that "transparent elements" should be given this interpretation. If the orientation of the sample from which the photographic sandwich 12 was made is known, the direction of the long axis L can be determined. In actual practice, of course, there may be hundreds or more of transparent elements 13 contained within the sample but the directional trend of the long axes of these transparent elements would be statistically evaluated. The transparencies may be placed in registered relationship by marking an original transparency at several locations thereon, making a duplicate transparency therefrom, and very carefully aligning the transparencies on opposite sides of a glass plate with the several markings aligned.

In Fig. 3 there is shown a system which can be utilized in carrying out my new method. This system consists of a source of light 30 and light intensity measuring means such as a photocell 31. Photocell 31 is connected to a meter 32 upon which the intensity of light detected by the photocell 31 is indicated. Disposed between the light source 30 and the photocell 31 is an orientation device 32. The photographic sandwich is mounted upon the orientation device 32 in a manner such that light is transmitted through the photographic sandwich and detected by photocell 31. The light source 30 is located approximately in the focal point of a lens 33 so that light which passes through the lens and through the orientation device 32 is substantially parallel or collimated light. Light transmitted through the photographic sandwich is detected by the photocell 31.

Figure 4:
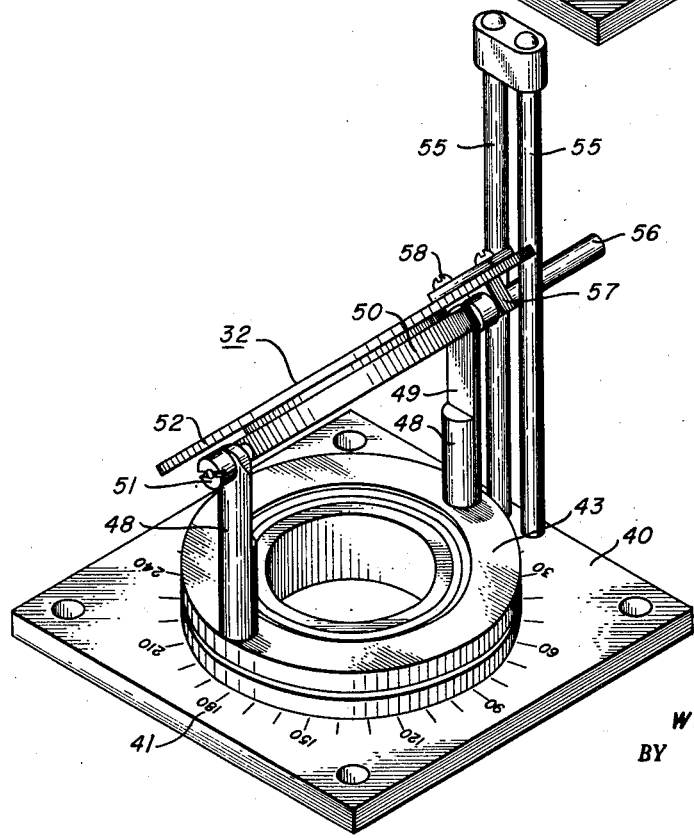
Fig. 4 is a perspective view of the orientation device utilized in carrying out my new method.

Figs. 4, 5 and 6 show the orientation device 32 in greater detail. The orientation device 32 includes a support 40 upon which is formed an azimuthal scale 41. The support 40 has a portion thereof of reduced diameter 42 as shown in Fig. 6. The reduced diameter portion is adapted to fit within the inside periphery of ring member 43. A roller bearing race 44 is located between the reduced diameter portion 42 of support 40 and the inside periphery of ring member 43. Therefore, the ring member 43 may be rotated about the reduced diameter portion 42 of support 40. An index member 45 having a pointer 46 is attached to the ring member 43 by means of screws 47.

Mounted upon the ring member 43 are posts 48 which have a cut-out portion 49, which cut-out portion is adapted to receive a second ring member 50. The angle of tilt or inclination of ring member 50 is adjustable by means of set screws 51.

A platform 52 having a portion of reduced diameter 53 is also included in my new orientation device. The reduced diameter portion 53 is adapted to fit within the periphery of the ring member 50. A bearing race 54 is positioned between the reduced diameter portion 53 of platform 52 and the inside periphery of ring member 50.

Mounted adjacent the "zero" line on the azimuthal scale 41 are a pair of separated guide rods 55. The guide rods 55 are designed to receive and guide the movement of a cylindrical extension member 56. Extension member 56 is connected to an extension member mount 57 which in turn is connected to the platform 52 by means of screws 58.

In carrying out my new method of obtaining the directional trend of a portion of a sample having different light transmission or reflection characteristics compared to other portions of the sample the orientated sample is first photographed and two photographic transparencies made. The two transparencies are made into a photographic sandwich and a geographic direction for example "north" is marked upon the photographic sandwich. The sandwich is then mounted upon the platform 52 with the north direction facing in the zero direction as indicated by the azimuthal scale 41. The platform is then tilted to such an angle that the light reading variation upon rotation is a maximum. This may be done by trial and error; the angle may be adjusted several times until a maximum reading is obtained on the meter 32. Ring member 43 is then rotated while the light intensity indicated by the meter 32 is observed. Ring member 50 is rotated along with the ring member 43 because of its innerconnection to ring member 43 by means of posts 48. As ring member 50 is rotated, extension member 56 and guide rods 55 will prevent the rotational movement of the "north" direction about its axis but will permit the direction of inclination of the platform 52 to be varied while at the same time keeping the angle of inclination constant. This movement is a yawing movement. When the maximum intensity is read on meter 32 the azimuth indicated by pointer 46 is noted. From the azimuth indicated by pointer 46 the azimuthal direction or orientation of the directional trend of the portions of the sample being investigated can be ascertained.

Assume that transparencies are made from a sample having a northeast-southwest trend, and that the transparencies are placed in platform 52 with the north direction of the sample at zero degrees on the scale. As the ring 43 is rotated, the direction of inclination of the transparencies will move in a circular sweep but the transparencies will not rotate about the axis of rotation of ring 43. When the direction of inclination of the transparencies is at either 45° or 325° on the scale, maximum light readings will be obtained because at this position the individual grains on the transparencies will be aligned with the light source to cause least interference with light rays attempting to pass therethrough. Minimum light readings will be obtained when pointer 47 is in the vicinity of 135° and 315° on the scale.

Although I have described my invention with a certain degree of particularity, it is understood that the present disclosure has been made only by way of example and that numerous changes in the method and the details of construction and the combination and arrangement of parts may be resorted to without departing from the spirit and the scope of the invention as hereinafter claimed.

What I wish to claim as new and useful and to secure by Letters Patent is:

1. Apparatus for determining the orientation for maximum light transmission through a translucent object having appreciable thickness, comprising: a tilted, rotatable annular member; a second member having a central transparent portion for receiving the translucent object; light source means and light intensity measuring means on opposite sides of said central transparent portion of said second member; said second member having a reduced diameter portion; roller bearings disposed between the outer periphery of said reduced diameter portion and the inner periphery of said tilted, rotatable member; two separated vertical guide members mounted to one side of said tilted, rotatable member; and an extension member mounted on said second member, said extension member being adapted to move vertically within said guide members as said tilted, rotatable member is rotated.

2. Apparatus for determining the directional trend of grains or voids in an earth sample, comprising: a light source; light intensity measuring means spaced from said light source and adapted to receive light from said light source; a platform disposed between said light source and said light intensity measuring means; said platform having a transparent portion for receiving a pair of identical, spaced-apart photographic transparencies of said earth sample, said transparencies being spaced apart in registered relationship to one another, said transparent portion being positioned so that any light from said source detected by said light measuring means must pass therethrough; means for tilting the axis of said platform so that the plane of said photographic transparencies is not normal to the line from said light source to said light intensity measuring means; means for preventing the rotation of said platform about its axis; and means for causing said axis of said platform to revolve about said line from said light source to said light intensity measuring means.

3. Apparatus for determining the directional trend of grains or voids in an earth sample, comprising: a support having an azimuthal scale thereon; a tiltable and rotatable ring member mounted upon said support and spaced from said support; a platform having a reduced diameter portion, said platform having a center transparent portion for receiving a pair of identical, spaced-apart photographic transparencies of said earth sample, said transparencies being spaced apart in registered relationship to one another; a light source and light intensity measuring means on opposite sides of said transparent portion; roller bearings disposed between the outer periphery of said reduced diameter portion and the inner periphery of said tiltable and rotatable ring member; and means for keeping one point on the periphery of said platform facing in a constant direction as said rotatable ring member is rotated.

4. Apparatus for determining the directional trend of grains or voids in an earth sample, comprising: a tilted, rotatable annular member; a second member having a reduced diameter portion, said second member having a transparent portion for receiving a pair of identical, spaced-apart photographic transparencies of said earth sample, said transparencies being spaced apart in registered relationship to one another; light source means and light intensity measuring means on opposite sides of said transparent portion positioned so that light from said light source detected by said light intensity measuring means must pass through the photographic transparencies; roller bearings disposed between the outer periphery of said reduced diameter portion and the inner periphery of said tilted, rotatable member; two separated vertical guide members mounted on one side of said tiltable, rotatable member; and an extension member mounted on said second member, said extension member being adapted to move vertically within said guide members as said tilted, rotatable member is rotated.

References Cited in the file of this patent

UNITED STATES PATENTS

| | | |
|---|---|---|
| 816,933 | Neumann | Apr. 3, 1906 |
| 1,766,037 | Dawson | June 24, 1930 |
| 1,916,609 | Emmons | July 4, 1933 |
| 1,953,471 | Eich | Apr. 3, 1934 |
| 1,963,342 | Whitson et al. | June 19, 1934 |
| 1,967,583 | McFarlane et al. | July 24, 1934 |
| 2,241,743 | Schoene | May 13, 1941 |
| 2,497,070 | Coleman | Feb. 14, 1950 |
| 2,513,083 | Eckert | June 27, 1950 |
| 2,533,747 | Thienemann | Dec. 12, 1950 |